US010130025B2

(12) United States Patent
Thorsell et al.

(10) Patent No.: US 10,130,025 B2
(45) Date of Patent: Nov. 20, 2018

(54) ROTARY CUTTER WITH PARALLEL PIVOT WHEELS

(71) Applicant: Great Plains Manufacturing, Inc., Salina, KS (US)

(72) Inventors: Erik Thorsell, Salina, KS (US); Rodney Hake, Tipton, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 437 days.

(21) Appl. No.: 14/943,887

(22) Filed: Nov. 17, 2015

(65) Prior Publication Data

US 2016/0135354 A1 May 19, 2016

Related U.S. Application Data

(60) Provisional application No. 62/081,235, filed on Nov. 18, 2014.

(51) Int. Cl.
*A01D 34/73* (2006.01)
*A01B 63/16* (2006.01)
*A01D 75/00* (2006.01)
*A01D 34/66* (2006.01)

(52) U.S. Cl.
CPC ............ *A01B 63/16* (2013.01); *A01D 75/002* (2013.01); *A01D 34/66* (2013.01)

(58) Field of Classification Search
CPC ....... A01B 63/16; A01D 75/002; A01D 34/66
USPC ....... 56/255, 6, 14.7–14.9, 17.2, 228, 320.1, 56/322, DIG. 10
See application file for complete search history.

(56) References Cited

U.S. PATENT DOCUMENTS

| 1,875,778 | A | * | 9/1932 | Taylor | B60G 21/007 172/507 |
| 4,594,951 | A | * | 6/1986 | Grataloup | A01C 5/062 111/195 |
| 5,355,664 | A | * | 10/1994 | Zenner | A01D 34/82 16/35 D |
| 5,366,336 | A | * | 11/1994 | Friesen | A01B 63/16 172/328 |
| 6,594,980 | B2 | * | 7/2003 | Oka | A01D 34/661 56/15.8 |
| 8,186,449 | B2 | * | 5/2012 | Hackert | A01B 73/00 172/288 |

(Continued)

Primary Examiner — Thomas B Will
Assistant Examiner — Mai T Nguyen
(74) Attorney, Agent, or Firm — Hovey Williams LLP

(57) ABSTRACT

An agricultural implement for use with a tractor. The agricultural implement comprises a main body, a hitch, a plurality of wheel support assemblies, and a pair of wheels coupled to each of the wheel support assemblies. Each of the wheel support assemblies includes a longitudinal support assembly extending rearward from the main body. The wheel support assemblies further include a transverse support assembly coupled to the longitudinal support assembly, with each of the wheels of the pair of wheels being disposed on opposite sides of the transverse support assembly, and with the transverse support assembly being rotatable relative to the main body, such that raising one wheel of the pair of wheels causes the corresponding lowering of another wheel of the pair of wheels. The wheel support assemblies also include a rotational damping mechanism for restricting rotation of the transverse assembly and the pair of wheels relative to the main body.

20 Claims, 13 Drawing Sheets

(56) References Cited

U.S. PATENT DOCUMENTS

| | | | |
|---|---|---|---|
| 9,072,214 B2* | 7/2015 | Connors | A01B 63/006 |
| 2013/0048323 A1* | 2/2013 | Hake | A01B 21/08 172/581 |
| 2016/0324068 A1* | 11/2016 | Thorsell | A01D 34/76 |

* cited by examiner

ROTARY CUTTER WITH PARALLEL PIVOT WHEELS

RELATED APPLICATION

This non-provisional patent application claims priority to U.S. Provisional Patent Application Ser. No. 62/081,235, filed on Nov. 18, 2014, and entitled "ROTARY CUTTER WITH PARALLEL PIVOT WHEELS," the entire disclosure of which is incorporated by reference into this non-provisional patent application.

FIELD

Embodiments of the present invention are directed to a rotary cutter with parallel pivot wheels. In more detail, embodiments of the present invention are directed to pull-behind rotary cutters that include one or more parallel pivot wheels for supporting the rotary cutters on the ground.

BACKGROUND

Rotary cutters are agricultural implements used for cutting large areas of vegetation, such as grass, weeds, shrubs, and the like. Rotary cutters often come in the form of attachments configured to be pulled behind a heavy-equipment machine, such as a tractor, which pulls the rotary cutters across the ground on which the vegetation to be cut is growing. Specifically, a back side of the tractor can be connected to a front side of the rotary cutter, such that the rotary cutter can be pulled by the tractor. In addition to pulling the rotary cutter, in some instances, the tractor can provide the rotary power required to operate the rotary cutter's cutting blades. In other instances, the rotary cutter has its own, internal power source for operating the cutting blades and other features of the rotary cutter.

Rotary cutters often include one or more wheels to support the rotary cutter while it is being pulled by the tractor. Generally, the wheels are supported on a back side of the rotary cutter so as to support the rotary cutter as it is being supported and pulled at its front side by the tractor. Some previously-used rotary cutters include fixed wheels that are individually secured to a back side of the rotary cutter. However, such wheels may not be ideal because they do not function efficiently on rough terrain. Furthermore, such wheels may not hold the ground well, especially on uneven terrain.

An additional style of rotary cutter uses a "walking-tandem" wheel configuration. In such a configuration, pairs of wheels are positioned one behind the other and are configured to pivot/rock about a pivot axis located between the wheels. For example, a walking-tandem wheel assembly may include a first wheel positioned behind the back side of the rotary cutter, as well as a second wheel positioned behind the first wheel, with a pivot axis located between the first and second wheels. Walking-tandem wheel configurations can be beneficial because, for example, they can hold the rotary cutter better on steep slopes, they can facilitate improved cutting on rough terrain, and the can reduce mechanical fatigue. Nevertheless, walking-tandem wheel configurations have several inherent disadvantages. For instance, the wheels are required to extend significantly behind the rotary cutter, which reduces maneuverability of the rotary cutter. Additionally, such a configuration places significant strain on the wheels and the wheel assemblies, especially when turning. Furthermore, in many instances, one or more of the wheels will drag along the ground during turning maneuvers, thereby cutting ruts in the ground and/or damaging vegetation.

Therefore, there exists a need for a wheel assembly for a rotary cutter that provides for enhanced maneuverability and stability of the rotary cutter, while including components that reduce fatigue-related issues of the wheel assembly such that the wheel assembly will have a prolonged, useful life.

SUMMARY

An embodiment of the present invention may include an agricultural implement for use with a tractor. The agricultural implement may comprise a main body, a hitch extending forward from the main body and operable to couple the implement to the tractor, a plurality of wheel support assemblies extending rearward from the main body, and a pair of wheels coupled to each of the wheel support assemblies. Each of the wheel support assemblies includes a longitudinal support assembly extending generally rearward from the main body. The wheel support assemblies each further include a transverse support assembly coupled to the longitudinal support assembly, with each of the wheels of the pair of wheels being disposed on generally opposite sides of the transverse support assembly, and with the transverse support assembly being rotatable relative to the main body, such that a raising of one wheel of the pair of wheels causes a corresponding lowering of another wheel of the pair of wheels.

Another embodiment of the present invention may include a rotary cutter for cutting vegetation. The rotary cutter may comprise a cutter housing, one or more cutter blades extending down from a bottom side of the cutter housing, a hitch extending forward from the cutter housing, with the hitch being operable to connect the rotary cutter with a tractor. The rotary cutter may further comprise a plurality of wheel support assemblies extending along a back side of the cutter housing, and a pair of wheels coupled to each of the wheel support assemblies, with the wheels of each of the pairs of wheels being generally aligned in parallel relationship and spaced laterally apart across the back side of the cutter housing. Each of the wheel support assemblies may include a longitudinal support assembly extending generally rearward from the cutter housing. The wheel support assemblies may also include a transverse support assembly coupled to the longitudinal support assembly, with the pair of the wheels being coupled to the transverse support assembly, and with the transverse support assembly being rotatable relative to the cutter housing such that a raising of one wheel of the pair of wheels causes a corresponding lowering of another wheel of the pair of wheels.

A further embodiment of the present invention may include a method of operating an agricultural implement that is configured to be pulled behind a tractor. The implement comprises at least one pair of wheels supporting the implement from the ground, with the pair of wheels being secured to the implement in a transversely spaced parallel relationship via a wheel support assembly. The wheel support assembly may comprise a longitudinal support assembly extending from a back side of the agricultural implement and a transverse support assembly rotatably coupled with the longitudinal support assembly. The method may comprise an initial step of operating the tractor such that the agricultural implement is pulled behind the tractor over a ground surface. The method may include an additional step of directing the wheel support assembly over a generally horizontal portion of the ground surface, such that the transverse support assembly is orientated generally horizontally. The method may include a further step of directing the wheel support assembly over an uneven portion of the ground surface, such that the uneven ground surface causes a first wheel of the pair of wheels to raise and a second wheel of the pair of wheels to lower, and such that each of the first and second wheels maintain contact with the ground surface.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
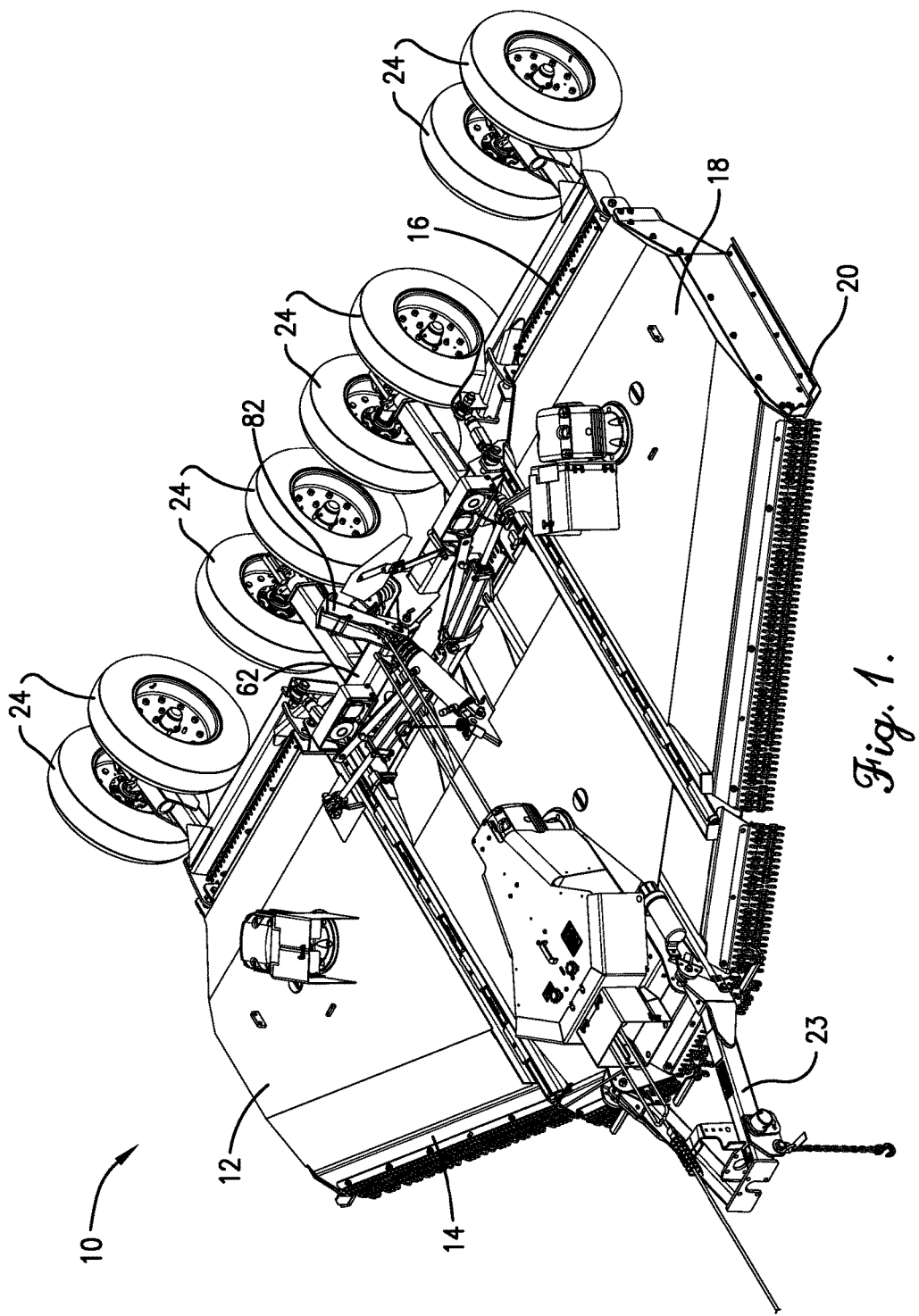
FIG. 1 is a top front perspective view of a rotary cutter according to embodiments of the present invention.
Figure 2:
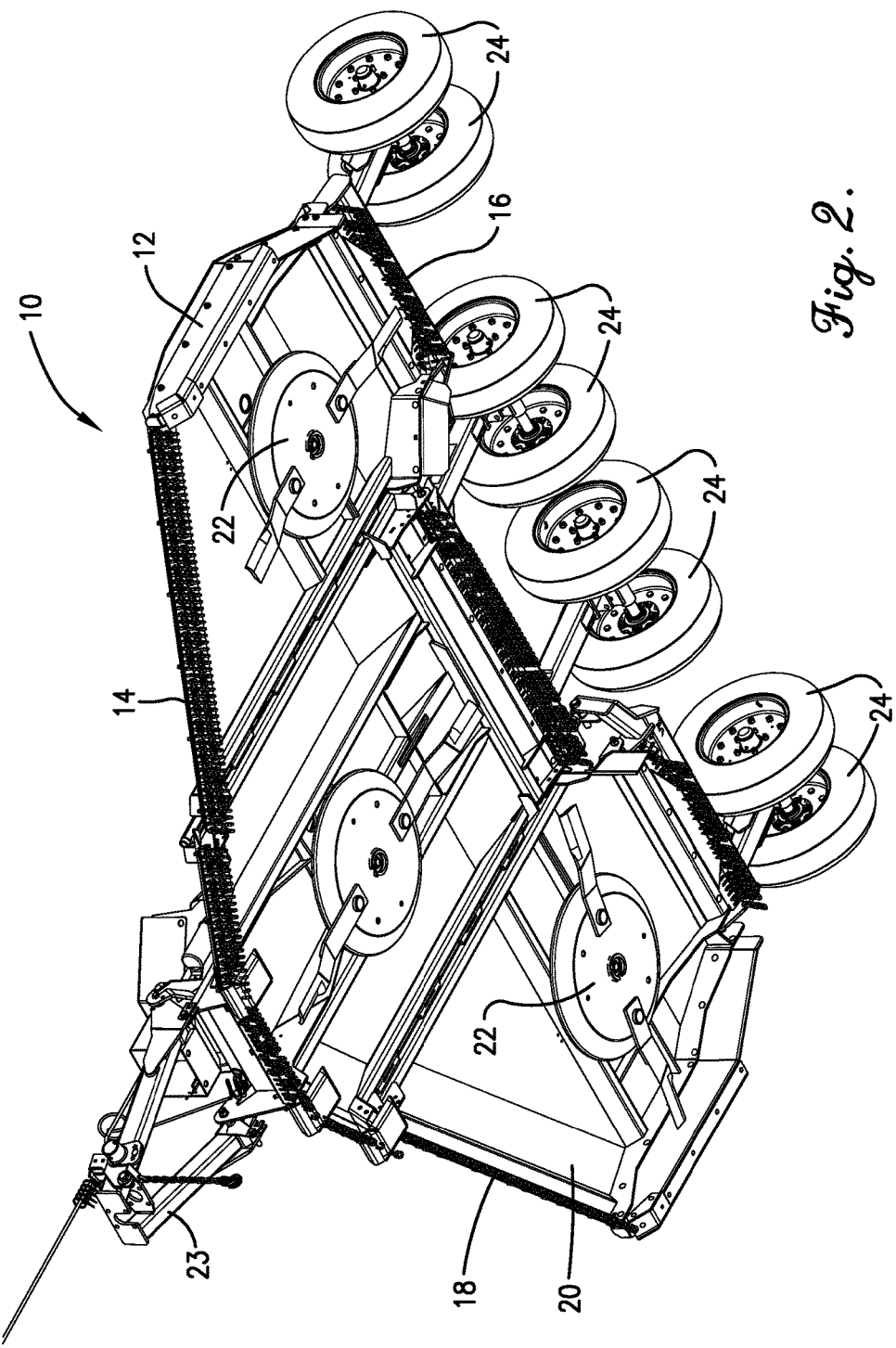
FIG. 2 is a bottom front perspective view of the rotary cutter from FIG. 1.
Figure 3:
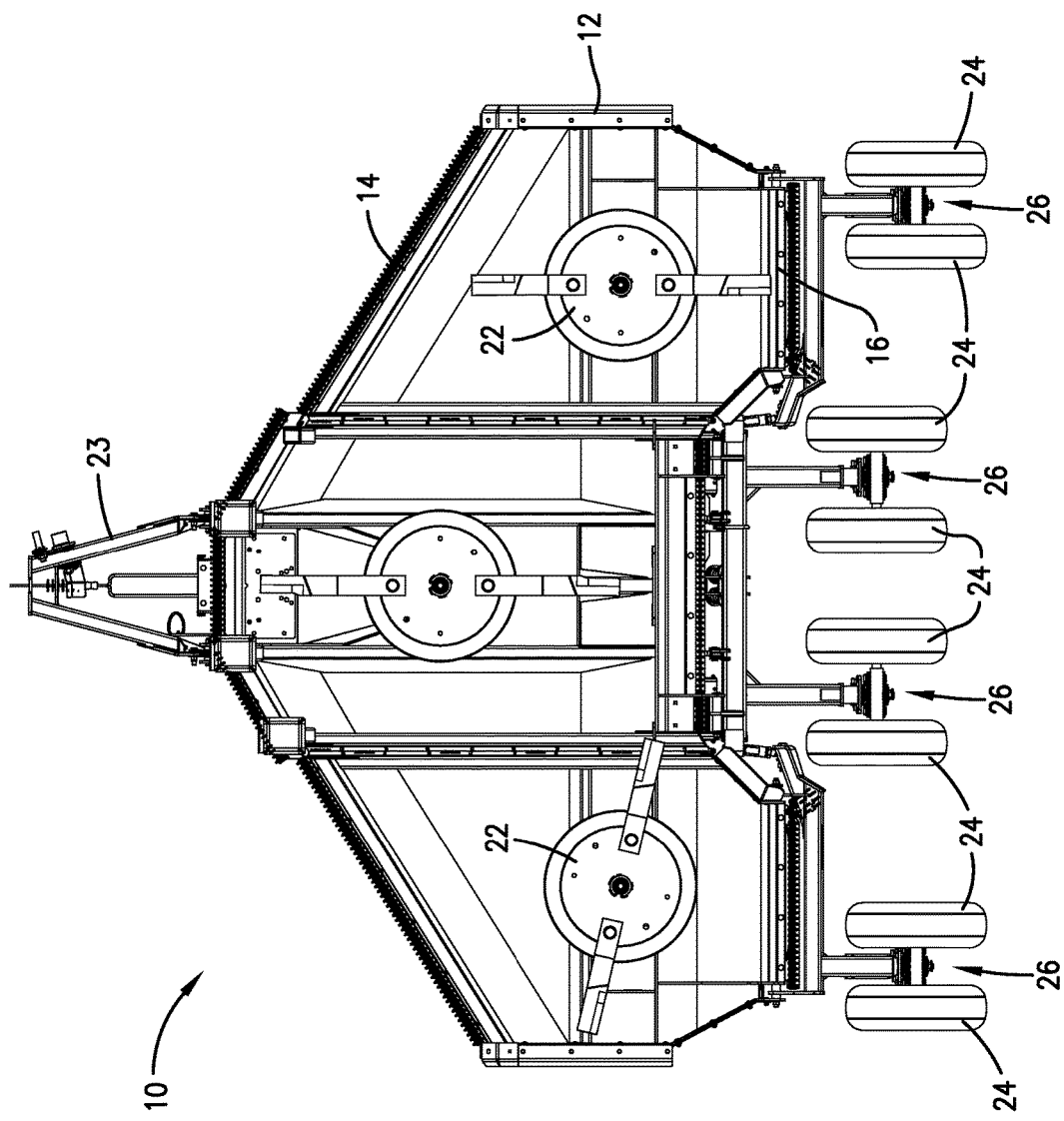
FIG. 3 is a bottom plan view of the rotary cutter from FIGS. 1-2.
Figure 4:
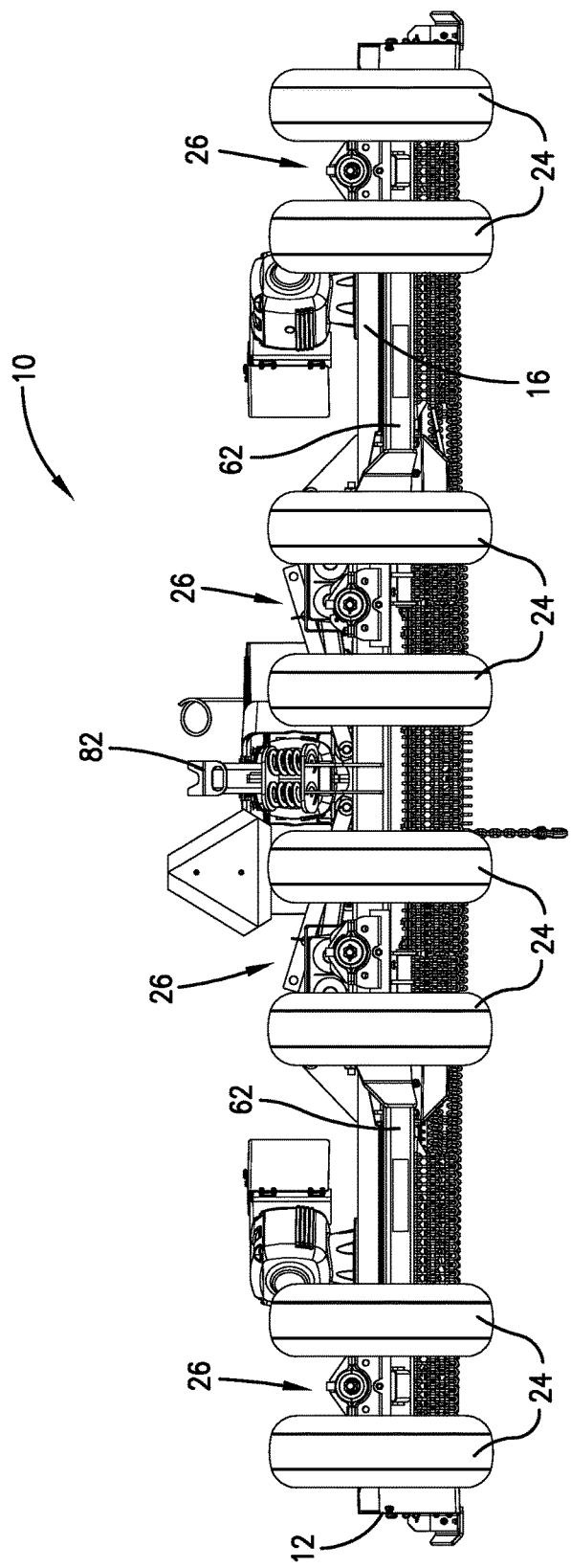
FIG. 4 is a back side elevation view of the rotary cutter from FIGS. 1-3.
Figure 5:
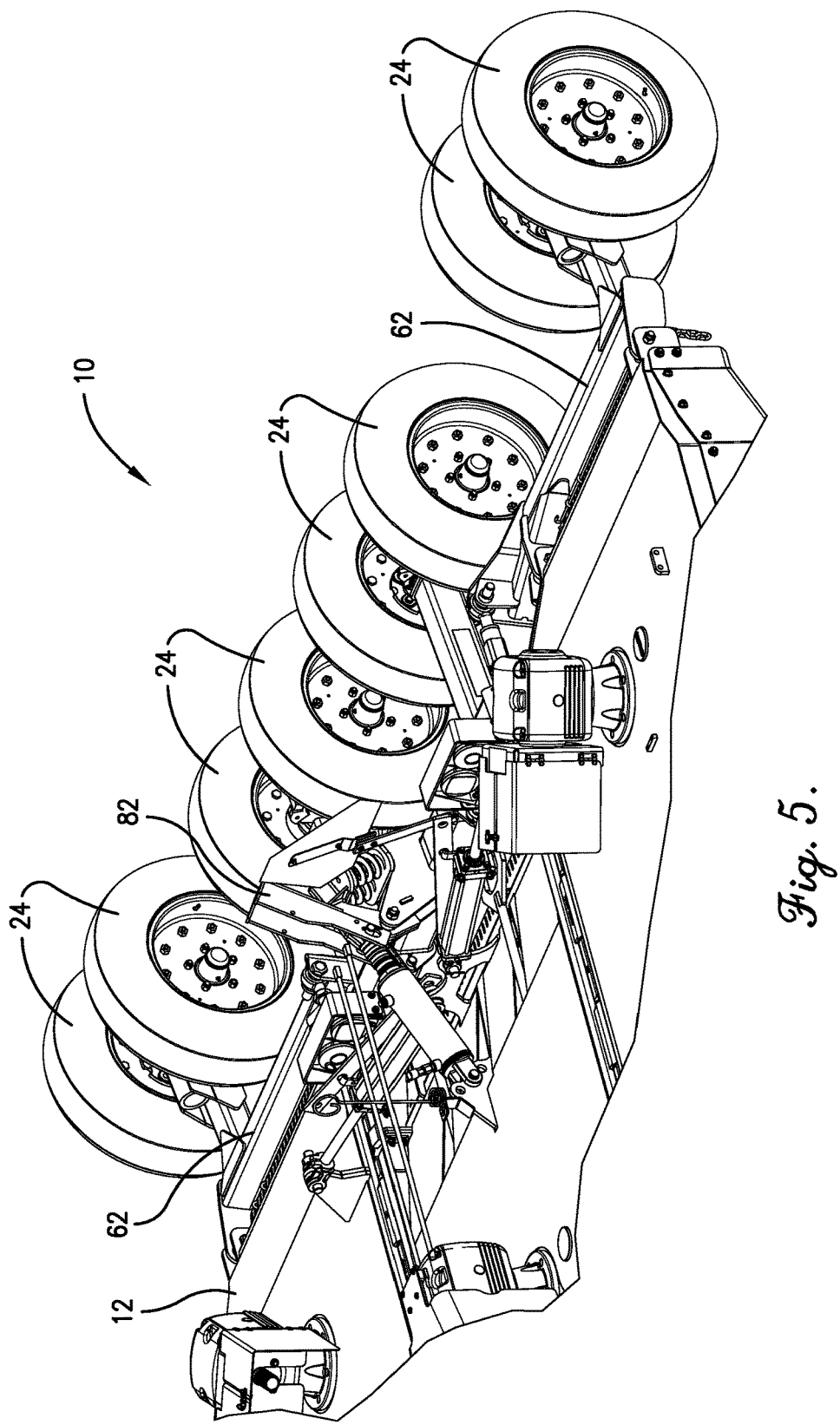
FIG. 5 is a partial perspective view of the rotary cutter from FIGS. 1-4, particularly illustrating a number of wheel support assemblies and wheels extending from a back side of the rotary cutter.
Figure 6:
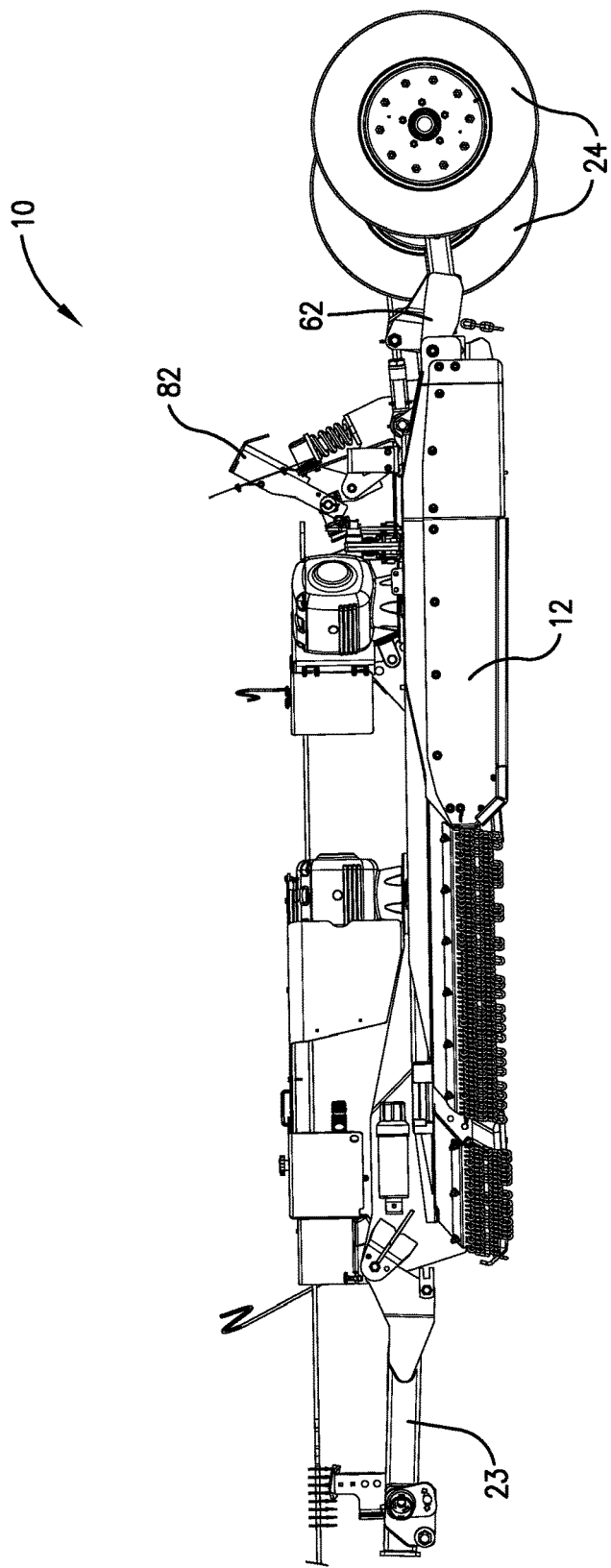
FIG. 6 is a side elevation view of the rotary cutter from FIGS. 1-5.

With reference to FIGS. 1-6, embodiments of the present invention are broadly directed to a rotary cutter 10 configured for being pulled behind a tractor (not shown). However, it is understood that embodiments of the present invention can be directed to other types of implements and/or attachments used with tractors, such as tillers, seeders, compactors, or the like. Regardless, as particularly illustrated in FIGS. 1-2, the rotary cutter 10 may comprise a cutter housing 12 having a front side 14, a back side 16, a top side 18, and a bottom side 20. As shown in FIG. 2, the cutter housing 12 may include one or more cutter blades 22 extending from the bottom side 20 of the housing 12. The rotary cutter 10 may additionally include a hitch 23 extending forwardly from the front side 14 of the housing 12 for connection to the tractor. It should be understood, however, that other types of implements and/or attachments (e.g., tillers, seeders, compactors, or the like) may not necessarily include a housing as a main body, but may, instead, include other types of main bodies, such as platforms, frames, support structures, or the like.

Remaining with FIGS. 1-6, the rotary cutter 10 may additionally comprise one or more wheels 24 configured to support the housing 12 from the ground. As perhaps best shown in FIGS. 3-4, each of the wheels 24 may be secured to the back side 16 of the housing 12 via a wheel support assembly 26. As such, with the wheels 24 and the wheel support assemblies 26 secured to the back side 16 of the rotary cutter 10, the rotary cutter 10, under power of the tractor, is configured to pull the wheels 24 and/or the wheel support assemblies 26. In embodiments in which other types of implements and/or attachments (e.g., tillers, seeders, compactors, or the like) are used, the wheels 24 and/or the wheel support assemblies 26 may be secured to the back side of the main bodies of the implements and/or attachments (e.g., platforms, frames, support structures, or the like), such that the main bodies are configured to pull the wheels 24 and/or the wheel support assemblies 26.

In certain embodiments, a pair of the wheels 24 will be secured to the housing 12 in a generally parallel manner via each of the wheel support assemblies 26. Furthermore, as will be described below, each of the wheel support assemblies 26 may allow its pair of wheels to pivot about the wheel support assembly 26. As such, the wheel support assemblies 26 may be described as "parallel pivot" wheel support assemblies 26. Embodiments of the present invention provide for the rotary cutter 10 to include a varied numbers of pairs of wheels 24 and wheel support assemblies 26. For example, the embodiments illustrated in the drawings include a rotary cutter 10 with four pairs of wheels 24 and four wheel support assemblies 26. However, other rotary cutters or other implements and/or tractor attachments may include two, three, five, six, seven, eight, or more pairs of wheels 24 and two, three, five, six, seven, eight, or more wheel support assemblies 26.

Figure 7:
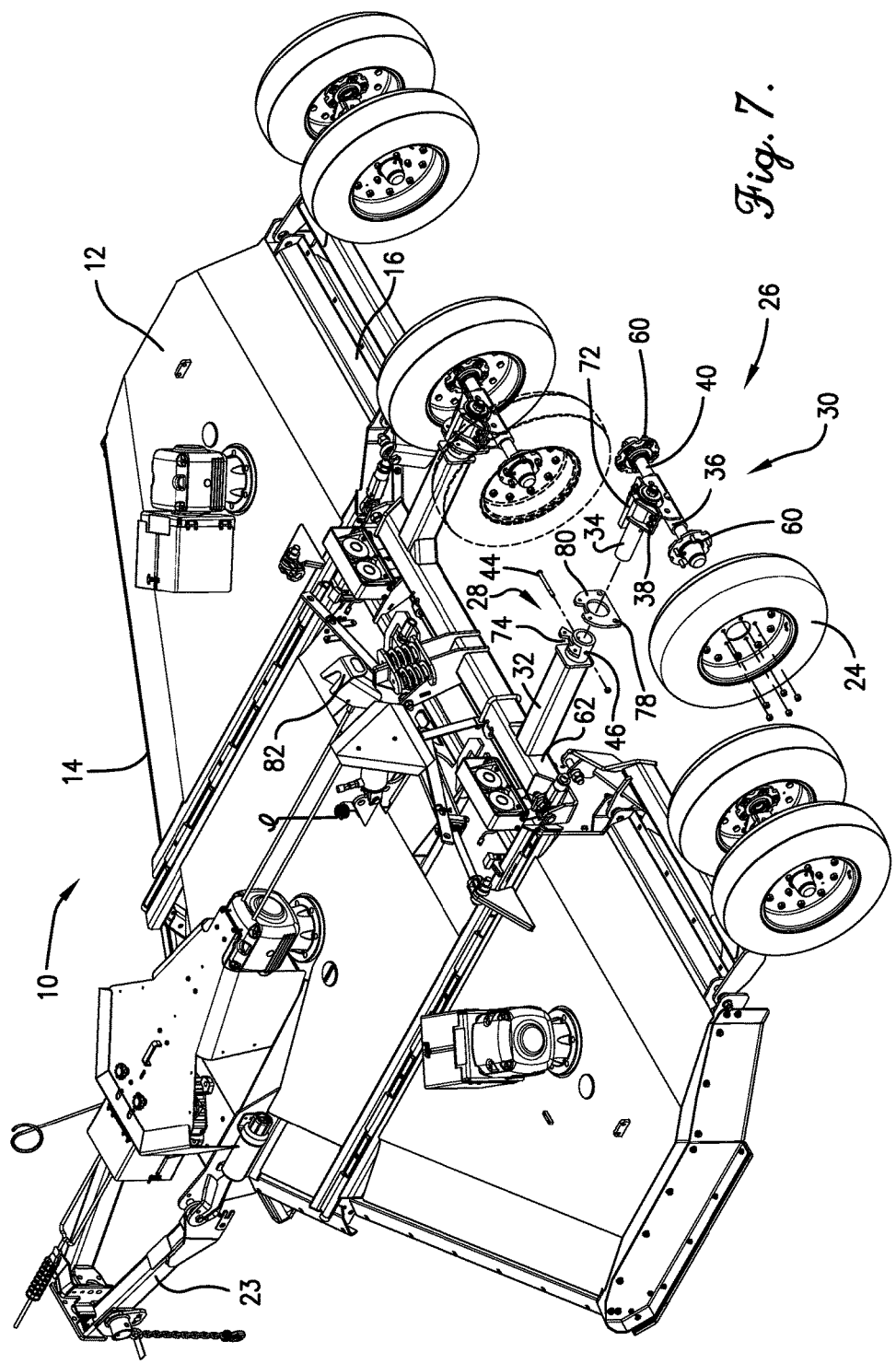
FIG. 7 is a top back perspective view of the rotary cutter from FIGS. 1-6, with one of the wheel support assemblies shown in exploded view.
Figure 8:
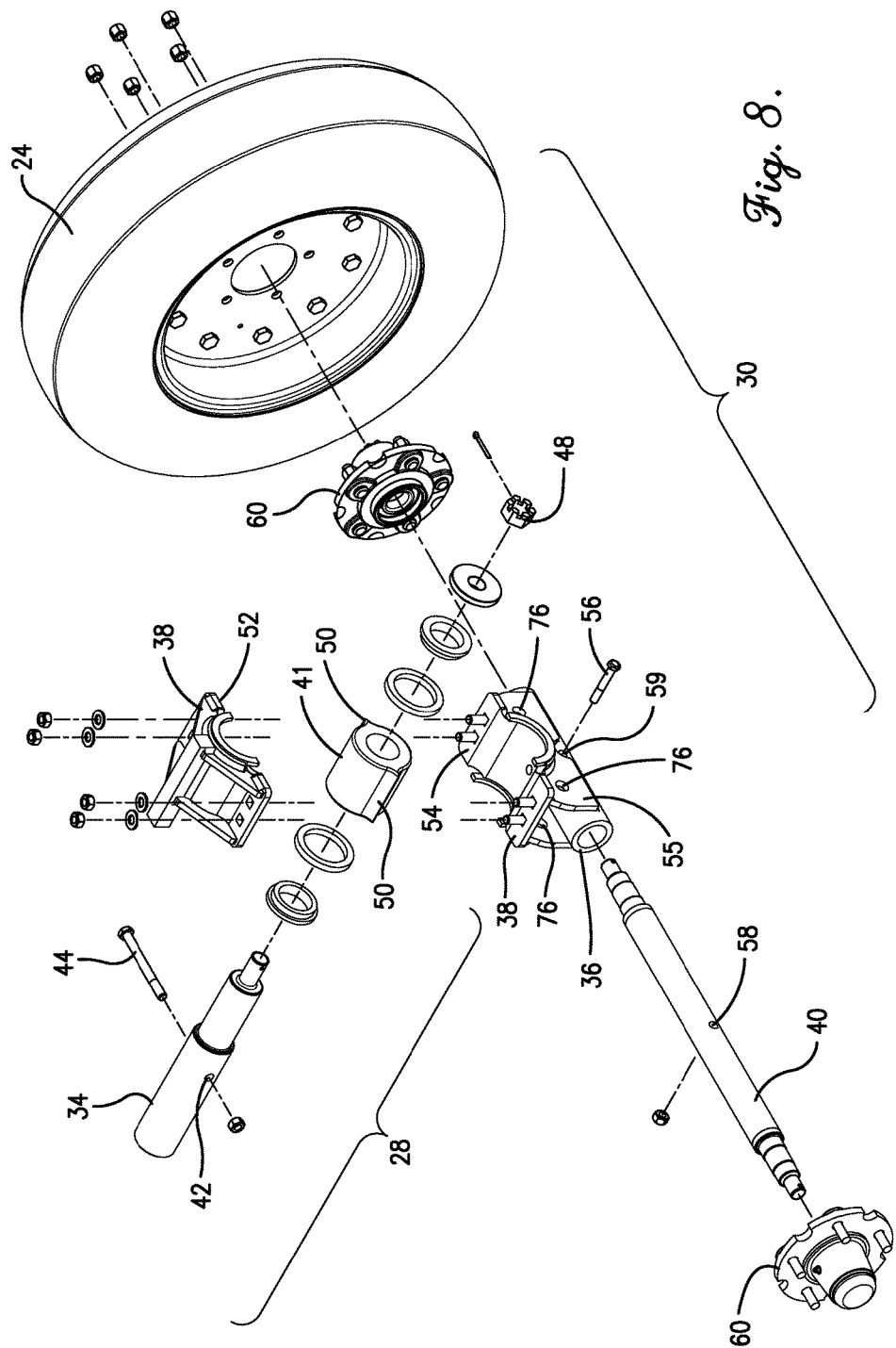
FIG. 8 is a further exploded view of a portion of the exploded wheel support assembly from FIG. 7.
Figure 9:
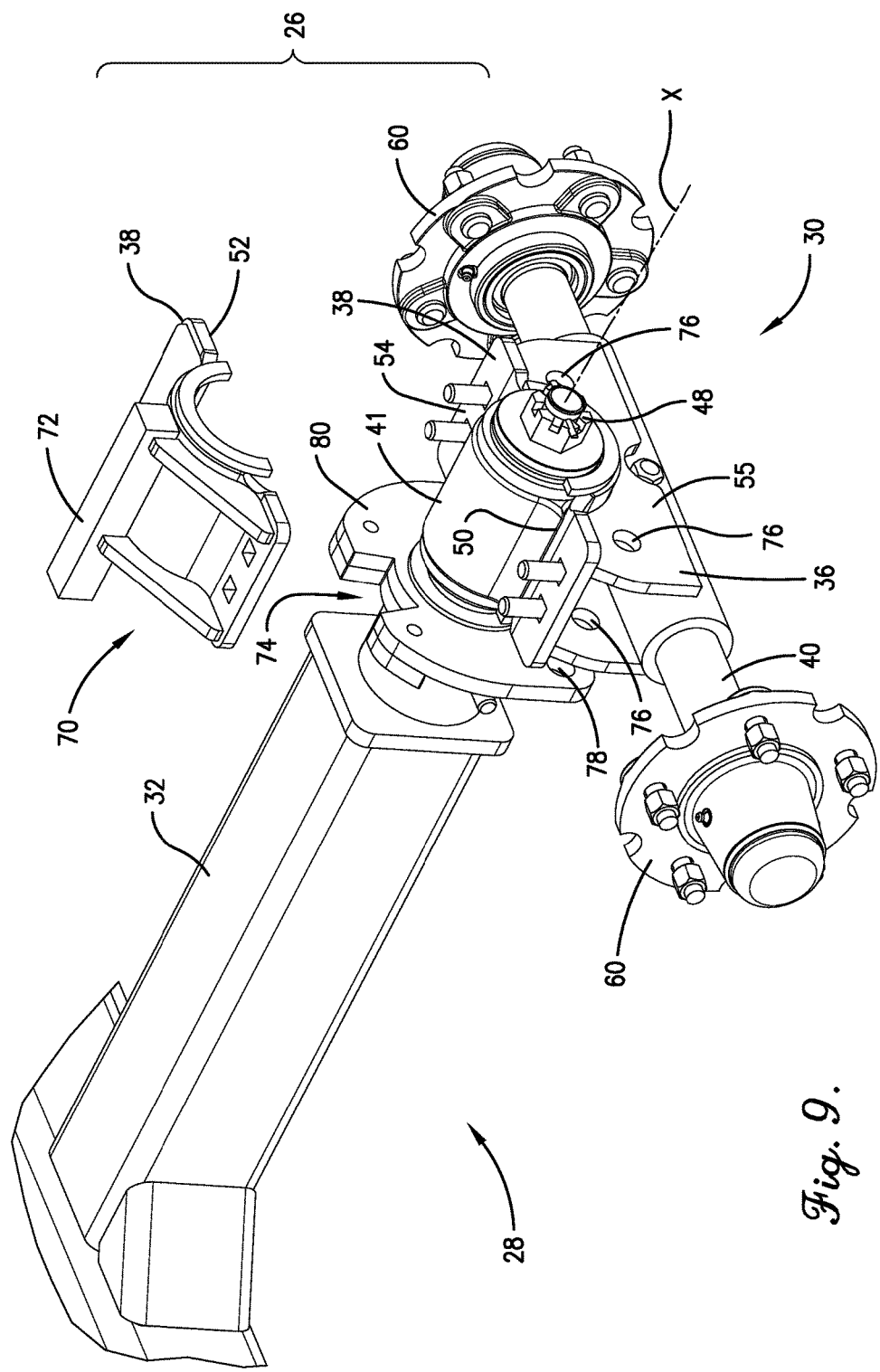
FIG. 9 is a perspective view of a wheel support assembly according to embodiments of the present invention, particularly showing a longitudinal support assembly and transverse support assembly, and with a portion of a bracket from the transverse support assembly being shown in exploded form.
Figure 10:
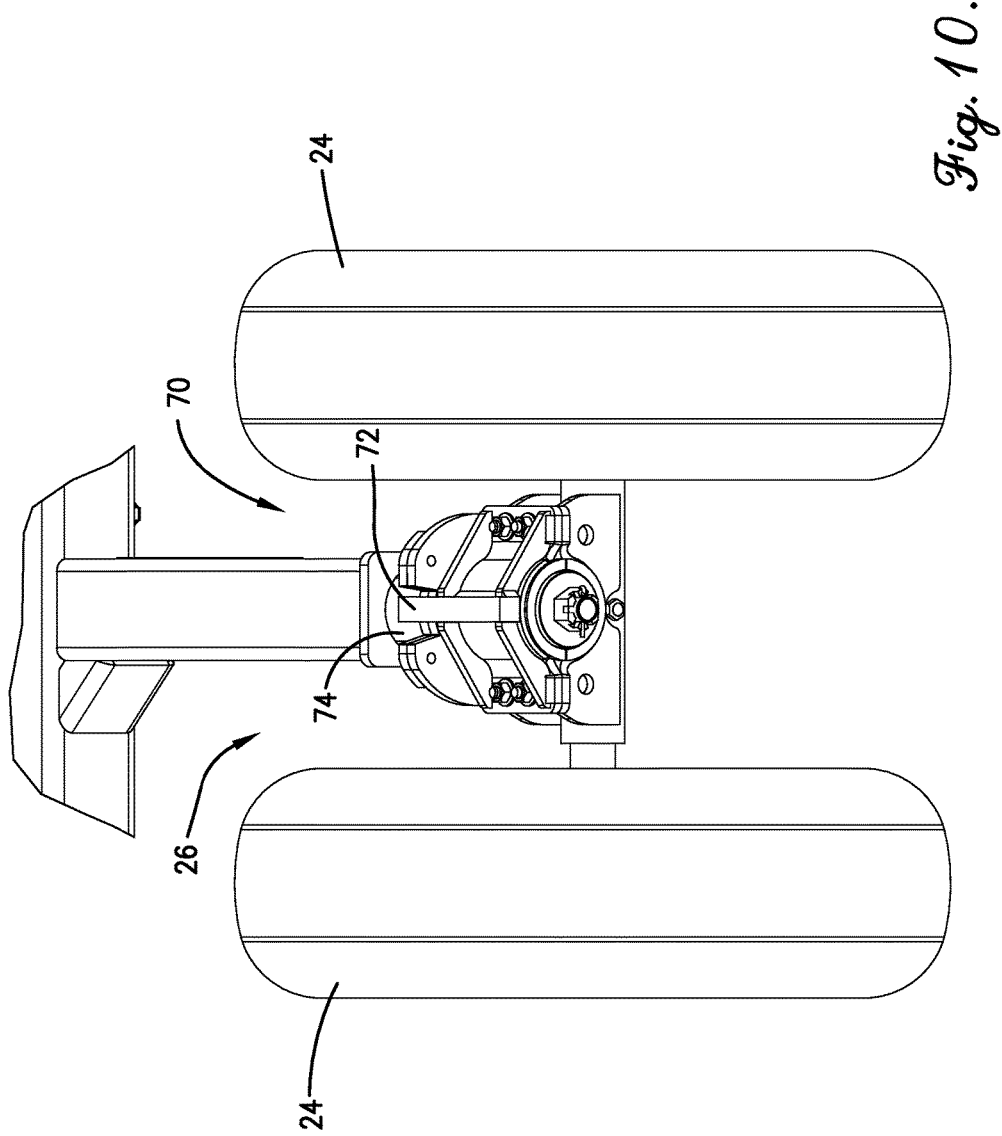
FIG. 10 is a top back perspective view of the wheel support assembly from FIG. 9, further include a pair of wheels connected to the transverse support assembly.
Figure 11:
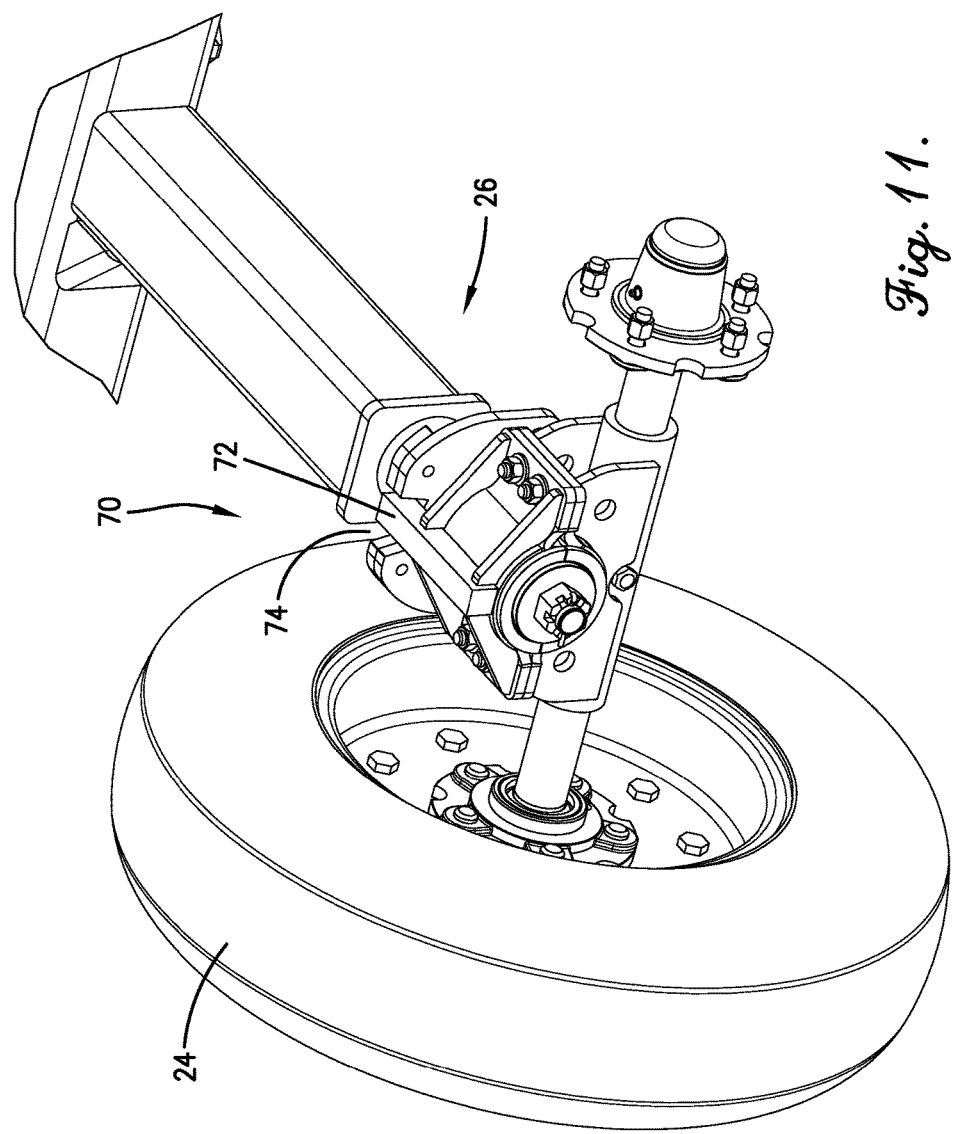
FIG. 11 is a side back perspective view of the wheel support assembly from FIGS. 9-10, with one of the wheels removed to further illustrate the longitudinal support assembly and the transverse support assembly.
Figure 12:
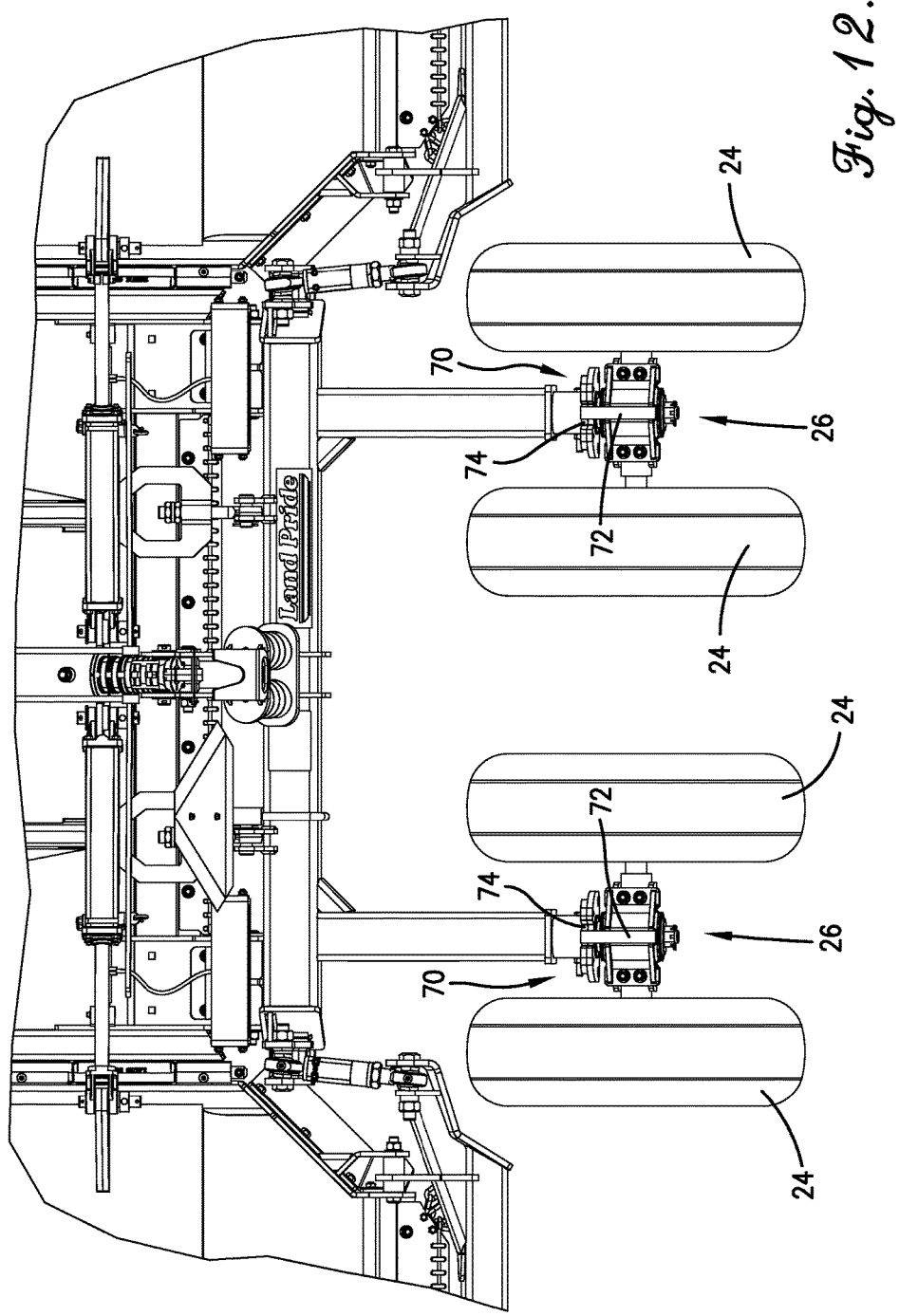
FIG. 12 is a top partial plan view of two wheel support assemblies from the rotary cutter of FIGS. 1-6.

Turning to the wheel support assembly 26 in more detail, and with particular reference to FIGS. 7-9, the wheel support assembly 26 may comprise a longitudinal support assembly 28 extending from the back side 16 of the housing 12 and a transverse support assembly 30 extending from the longitudinal support assembly 28. In some embodiments, the longitudinal support assembly 28 may comprise a main support component 32 rigidly extending from the back side 16 of the housing 12 and a longitudinal pivot spindle 34 engaged with and extending from the main support component 32. In some embodiments, as will be described in more detail below, a proximal portion of the pivot spindle 34 may be at least partially received in a distal portion of the main support component 32. As used herein, the term "distal" means a direction away from a front side 14 of the cutter housing 12, and the term "proximal" means a direction toward the front side 14 of the cutter housing 12. The transverse support assembly 30 of the wheel support assembly 26 may comprise a bracket 38 secured around the distal portion of the pivot spindle 34, a receiving element 36 secured to at least a portion of the bracket 38, and a transverse hub spindle 40 received within the receiving element 36 and positioned adjacent to the bracket 38. The hub spindle 40 is configured to receive one of the wheels 24 from the pair of wheels 24 on each of its ends. As perhaps best shown in FIG. 8, the wheel support assembly 26 may additionally include a rotational damping mechanism 41 positioned between the longitudinal support assembly 28 and the transverse support assembly 30, with the damping mechanism 41 surrounding a distal portion of the pivot spindle 34. However, in other embodiments, in place of the rotational damping mechanism 41 which may be positioned between the longitudinal support assembly 28 and the transverse support assembly 30, the wheel support assembly 26 may simply include one or more bearing assemblies, one or more bushings, or the like, or combinations thereof.

Focusing on the functionality of the wheel support assembly 26 in more detail, the hub spindle 40 may be rotatably linked with the main support component 32 and/or the pivot spindle 34 via the bracket 38 and the damping mechanism 41. As such, the hub spindle 40 is configured to rotate relative to the main support component 32 and/or the pivot spindle 34 about a longitudinal axis "X" (See FIG. 9). The longitudinal axis X may, in some embodiments, extend through a longitudinal centerline of the pivot spindle 34. Beneficially, because the wheels 24 are secured to each of the wheel support assemblies 26 via the hub spindle 40, rotation of the hub spindle 40 about the longitudinal axis X may cause a corresponding rotation and/or a vertical shifting of the wheels 24 relative to the main support component 32 and/or the pivot spindle 34. Furthermore, because the main support component 32 is held rigidly in place with respect to the housing 12 of the cutter 10, the wheels 24 are configured to rotate and/or vertically shift with respect to the housing 12.

As perhaps best illustrated in FIGS. 7 and 9, in some embodiments, the main support component 32 may comprise a generally elongated tubular component, such as a hollow cylinder, tube, or the like. As such, a proximal portion of the pivot spindle 34 may be configured to be received within an interior space presented by the main support component 32. The proximal portion of the pivot spindle 34 may include a through hole 42 (See FIG. 8) for receiving a fastener 44, such as a screw, a pin, a bolt (with an associated nut), or the like. Likewise, the main support component 32 may include a first set of through holes 46 (See FIG. 7) configured to align with the throughhole 42 of the pivot spindle 34. As such, with the fastener 44 received within the aligned through holes 42, 46, the pivot spindle 34 is held rigidly in place, and is prevented from rotating with respect to or being extracted from the support component 32. In some embodiments, the pivot spindle 34 may be secured to the support component 32 by other means, such as by weld.

As shown in FIG. 8, a radius of the pivot spindle's 34 distal portion may be less than a radius of the pivot spindle's 34 proximal portion. The reduced radius of the pivot spindle's 34 distal portion may facilitate the ability of the pivot spindle 34 to be engaged with other components of the wheel support assembly 26, such as the damping mechanism 41, as will be discussed in detail below.

Embodiments may provide for the damping mechanism 41 to comprise one or more damping elements, such as an elastomeric member, a spring, a hydraulic damper, a pneumatic damper, or the like. With particular reference to FIG. 8, the damping mechanism 41 may be formed as a hollow, cylindrically-shaped elastomeric member configured to be received around the distal portion of the pivot spindle 34. As such, the damping mechanism 41 may include a circular-shaped opening extending through its longitudinal center. In some alternative embodiments, the damping mechanism 41 may be differently shaped and may include a differently-shaped opening passing through its center, with such shapes including squares, polygons, stars, or the like. Regardless, the damping mechanism 41 may be fixedly secured to the pivot spindle 34, such that at least a portion of the damping mechanism 41 will not rotate with respect to the pivot spindle 34. For example, as shown in FIGS. 7-9, with the damping mechanism 41 positioned over the distal portion of the pivot spindle 34, a distal-most portion of the pivot spindle 34 may extend out distally from the damping mechanism 41. A securing nut 48 (See FIGS. 8-9) may be positioned over the distal-most end, so as to secure the damping mechanism 41 in place with respect to the pivot spindle 34. To aid in securing the damping mechanism 41 one or more rings, bushings, washers, and/or collars may be received on the pivot spindle 34 between the securing nut 48 and the damping mechanism 41 and/or between the damping mechanism 41 and the proximal portion of the pivot spindle 34. In some embodiments, the one or more rings, bushings, washers, and/or collars may be formed from various wear-resistant materials, such as nylatron or other similar plastics. Given the above, the damping mechanism 41 may be at least partially compressed against the pivot spindle 34, via the securing nut 48, such that at least a portion of the damping mechanism 41 is prevented from rotating with respect to the pivot spindle 34. Furthermore, in some embodiments, the distal portion of the pivot spindle 34 may have its outer surface formed with knurls (i.e., a pattern of straight, angled, or crossed lines) so as to further inhibit the damping mechanism 41 from rotating about the pivot spindle 34.

The damping mechanism 41 is configured to provide a dampening effect to the components of the wheel support assembly 26 as the components of the wheel support assembly 26 are actuated, rotated, and/or shifted during operation of the rotary cutter 10. In particular, the damping mechanism 41 may provide a rotational resistance for components of the wheel support assembly 26 that may rotate with respect to the main support component 32 and/or the housing 12. In other words, the damping mechanism may absorb and dissipate rotation of components of the wheel support assembly 26 so as to restrict such rotation. To accomplish such, the damping mechanism 41 may be formed from an elastomeric material having sufficient elastic and compressive properties. For example, in some embodiments the damping mechanisms 41 may be formed from polyisoprenes, resins, rubbers, or the like. In certain specific embodiments, the damping mechanism 41 may formed from a rubber having a Shore durometer of between 50 to 100 A, 60 to 90 A, 70 to 80 A, or about 75 A. As perhaps best shown in FIGS. 8-9, the damping mechanism 41 may include two flared lips 50 extending from opposite sides of an exterior portion of the damping mechanism 41, with the flared lips 50 extending substantially along an entire length of the damping mechanism 41. As will be discussed in more detail below, the flared lips 50 are configured to facilitate the engagement of the damping mechanism 41 with the bracket 38.

Turning to the bracket 38, as shown in FIGS. 8-9, certain embodiments provide for the bracket 38 to comprise an upper bracket half 52 and a lower bracket half 54. In some embodiments, the upper bracket half 52 and the lower bracket half 54 are secured together via one or more fasteners. In some embodiments, the upper and lower bracket halves 52, 54 may be secured together via weld. In other embodiments, the upper and lower bracket halves 52, 54 may be formed as a solid piece, such as via casting. The upper and lower bracket halves 52, 54 are shaped such that, when secured together, a space is presented between the upper and lower bracket halves 52, 54. As such, the distal portion of the pivot spindle 34 and the damping mechanism 41 can be received within the opening. In embodiments in which the bracket 38 is cast as a single piece, the damping mechanism 41 may be molded within the opening presented by the upper and lower bracket halves 52, 54. In certain embodiments, the flared lips 50 of the damping mechanism 41 are configured to fit securely between, or be compressed between, the upper and lower bracket halves 52, 54. As such, the damping mechanism 41 can be engaged with the bracket 38, and at least an outer radial portion of the damping mechanism 41 may be prevented from rotating with respect to the bracket 38.

In additional embodiments, the bracket 38 may be connected to the receiving element 36 via its lower bracket half 54. In specific embodiments, as shown in FIGS. 8-9, the lower bracket half 54 may include a connection component 55, which may comprise a pair of parallel plates, that extend downward and rigidly connect the lower bracket half 54 with the receiving element 36. In alternative embodiments, the receiving element 36 may be connected with the upper bracket half 52 of the bracket 38. Regardless, the receiving element 36 may be formed as a hollow cylinder, such that the hub spindle 40, which may be formed as solid cylindrical element, is configured to be at least partially received in the receiving element 36. In some embodiments, the hub spindle 40 may be configured to rotate within the receiving element 36, such that the hub spindle 40 acts as an axle for the wheels 24. In other embodiments, the hub spindle 40 may be fixedly secured in the receiving element 36 via one or more fasteners 56 that extend through aligned through holes 58, 59 of the hub spindle 40 and the receiver 36, respectively (See FIG. 8). Regardless, because the hub spindle 40 is received within the receiving element 36, which is rigidly connected to the bracket 38, the hub spindle 40 may be connected to the bracket 38 in a manner such that rotation of the bracket 38 (e.g., about the longitudinal axis X) will cause a corresponding rotation of the hub spindle 40. In general, the hub spindle 40 may be oriented orthogonal to the pivot spindle 34. In some embodiments, the hub spindle 40 may be set apart from the pivot spindle 34. However, it is to be understood that the hub spindle 40 may, in some embodiments, be positioned in a common plane with the pivot spindle 34.

In some embodiments, as illustrated in FIGS. 7-9, the hub spindle 40 can include a hub 60 on each of its free ends. The hubs 60 allow the wheels 24 of the pair of wheels 24 to be secured to the hub spindle 40 via the hubs 60. In embodiments in which the hub spindle 40 does not rotate within the receiving element 36, the hubs may be secured to the ends of the hub spindle 40 via a bearing-type connection, such that the hubs and the wheels attached thereto can rotate during operation of the cutter 10. As such, because the hub spindle 40 is connected to the bracket 38 via the receiving element 36, a rotation of the bracket 38 (e.g., about the longitudinal axis X) will cause a corresponding rotation of the hub spindle 40 and the wheels 24 secured thereto.

In certain embodiments, as perhaps best shown in FIGS. 9-12, each of the wheel support assemblies 26 may also comprise a mechanical stop system 70 for selectively restricting rotation of the hub spindle 40 relative to the housing 12 (e.g., about the longitudinal axis X) to a predetermined angular range of motion. The mechanical stop system 70 may comprise a lock bar 72 extending from the upper bracket half 52 of the bracket 38 proximally towards the main support component 32. As perhaps best illustrated by FIGS. 7 and 9-12, the main support component 32 may include a pair of spaced apart restriction elements on its distal end, with such restriction elements forming a receiving notch 74. When the wheel support assembly 26 is assembled, the lock bar 72 is configured to be received within the receiving notch 74. As will be discussed in more detail below, portions of the wheel support assembly 26 are generally configured to rotate during operation of the rotary cutter 10. However, with the lock bar 72 received within the receiving notch 74, the bracket 38, the hub spindle 40, and the pair of wheels 24 are restricted from rotating about the pivot spindle 34 by more than a predetermined angular range of motion. The predetermined angular range of motion may be defined by the space of the receiving notch 74. Specifically, as the transverse support assembly 30 is rotating and reaches a maximum of its angular range of motion, the lock bar 72 will come into contact with one of the restriction elements that forms the receiving notch, so as to prevent the transverse support assembly 30 from rotating any further. The distance between the two restriction elements (i.e., a width of the receiving notch 74), thus defines the predetermined angular range of motion. In some embodiments, the predetermined angular range of motion is not more than 90 degrees, not more than 60 degrees, not more than 50 degrees, not more than 40 degrees, not more than 30 degrees, not more than 20 degrees, or not more than 15 degrees.

In certain embodiments, each of the wheel support assemblies 26 comprises a mechanical lock system for selectively preventing rotation of the transverse support assembly 30 relative to the housing 12 (e.g., about the longitudinal axis X). In some embodiments, the mechanical lock system is operable to lock transverse support assembly 30 in a substantially horizontal position. As such, the mechanical lock system is operable to lock the wheels 24 of the pair of wheels 24 at substantially the same elevation. In some embodiments, as perhaps best illustrated in FIG. 8, the mechanical lock system may comprise one or more through holes 76 located on the bracket 38. In some embodiments, the through holes 76 may be located on the connection component 55 of the lower bracket half 54 of the bracket 38. Additionally, as shown in FIGS. 7 and 9, the main support component 32 may include a second set of one or more through holes 78 on its distal end. In some embodiments, the longitudinal support assembly 28 may include an attachment member 80 positioned on the distal end of the main support component 32, which such attachment member 80 including the one or more through holes 78 (See FIG. 7). In such embodiments, it is also noted that the attachment member 80 may also form the restriction elements that present the receiving notch 74. As such, the through holes 76, 78 of each of the bracket 38 and the main support component 32 are configured to be in alignment, such that a fastener (not shown), e.g., a bolt, a pin, or the like, can be simultaneously inserted within such through holes 76, 78. In such a configuration, the bracket 38, as well as the hub spindle 40 and the pair of wheels 24, are locked in place and prevented from rotating about the pivot spindle 34.

In operation, the rotary cutter 10 is configured to be pulled behind a tractor for cutting vegetation that is growing from the ground. The pairs of wheels 24 are configured to support the housing 12 of the rotary cutter 10 from the ground during operation. Advantageously, as illustrated in FIGS. 1-4, the pairs of wheels 24 can be positioned along generally the entire back side 16 of the rotary cutter 10 such that the pairs of wheels 24 securely hold the rotary cutter 10 to the ground, even on terrain that is severely sloped or that has uneven contours. In addition, such positioning of the pairs of wheels 24 provides enhanced support, stability, and maneuverability of the rotary cutter 12 without requiring that the wheels extend too far behind the rotary cutter 10, as is necessary in "in-line tandem" wheel configuration. Specifically, each of the wheel support assemblies 26 supports a pair of wheels 24, with such wheels 24 being laterally spaced apart across the back side 16 of the cutter and oriented generally parallel with each other. As such, the wheel support assembly 26 provides that no portion of the wheels 24 will be spaced distally from the housing 12 by a distance of more than 4, more than 3, or more than 2 wheel 24 diameters. In such a configuration, the rotary cutter 10 can include as many wheel support assemblies 26 as necessary to provide wheels 24 positioned along generally the entire length of the back side 16 of the cutter 10. Nevertheless, it should be understood that in other embodiments, the cutter 10 may include fewer wheel support assemblies 26, such that wheels 24 are not positioned along the entire back side 16 of the cutter 10 (i.e., substantial spaces may exist between the wheel support assemblies 26).

In addition to facilitating the ability of the wheels 24 to be positioned along the entire length of the back side 16 of the cutter 10, the wheel support assemblies 26 are configured to allow at least a minimal amount of rotation and/or vertical lifting and/or lowering of the wheels 24. As such, each of the wheels 24 associated with each of the wheel support assemblies can maintain continuous contact with the ground even when traversing steep and/or over uneven terrain. In more detail, as was described above with respect to the wheel support assemblies 26, the hub spindle 40 is rotatable relative to the housing 12. Specifically, the main support component 32 is held in place with respect to the housing 12 (e.g., via a base assembly 62, discussed in more detail below), such that the main support component 32 is not rotatable with respect to the housing 12. Similarly, the pivot spindle 34 is rigidly secured to the main support component 32 (e.g., via the fastener 44 inserted between through holes 46, 42 of the main support component 32 and pivot spindle 34), such that the pivot spindle 34 is not rotatable with respect to the housing 12. Similarly, a portion of the damping mechanism 41 is rigidly secured to the pivot spindle 34 (e.g., via the securing nut 48 and/or the knurled surface of the pivot spindle 34), such that a portion of the damping mechanism 41 is not rotatable with respect to the pivot spindle 34 and the housing 12. Specifically, the portion of the damping mechanism 41 that is not rotatable with respect to the pivot spindle 34 and the housing 12 may include an inner radial portion of the damping mechanism 41, i.e., a portion of the damping mechanism 41 that is closest to and/or adjacent to the pivot spindle 34. Contrastingly, however, because the damping mechanism 41 is formed from an elastic material, an outer radial portion of the damping mechanism 41, i.e., the portion of the damping mechanism 41 that is closest to and/or adjacent to the bracket 38, will be at least partly rotatable with respect to the pivot spindle 34 and the housing 12. It should be understood that such outer radial portion of the damping mechanism 41 may include the flared lips 50.

In more detail, although the inner radial portion of the damping mechanism 41 may be held securely in place with respect to the pivot spindle 34 (and, thus, the main support component 32 and the housing 12), because the damping mechanism 41 is elastic, any rotational force applied to the outer radial portion of the damping mechanism 41 will cause the outer radial portion to at least partially rotate in the direction of the applied force. The amount of actual rotation experienced by the outer radial portion may be dependent on the applied rotational force and by the elastic properties of the damping mechanism 41. Once the applied rotational force is equal to the Young's modulus of the damping mechanism 41 (which is related to the Shore durometer value) multiplied by the displacement of the damping mechanism 41, the outer radial portion of the damping mechanism 41 will stop rotating. Furthermore, once the applied rotational force has abated, the outer radial portion of the damping mechanism 41 will return to its initial static position due to the elastic properties of the damping mechanism 41. Because the bracket 38 is engaged with the outer radial portion of the damping mechanism 41 (e.g., via compression of the flared lips 50), any rotation of the outer radial portion of the damping mechanism 41 will be associated with a corresponding rotation of the bracket 38, the hub spindle 40, and the wheels 24.

Figure 13:
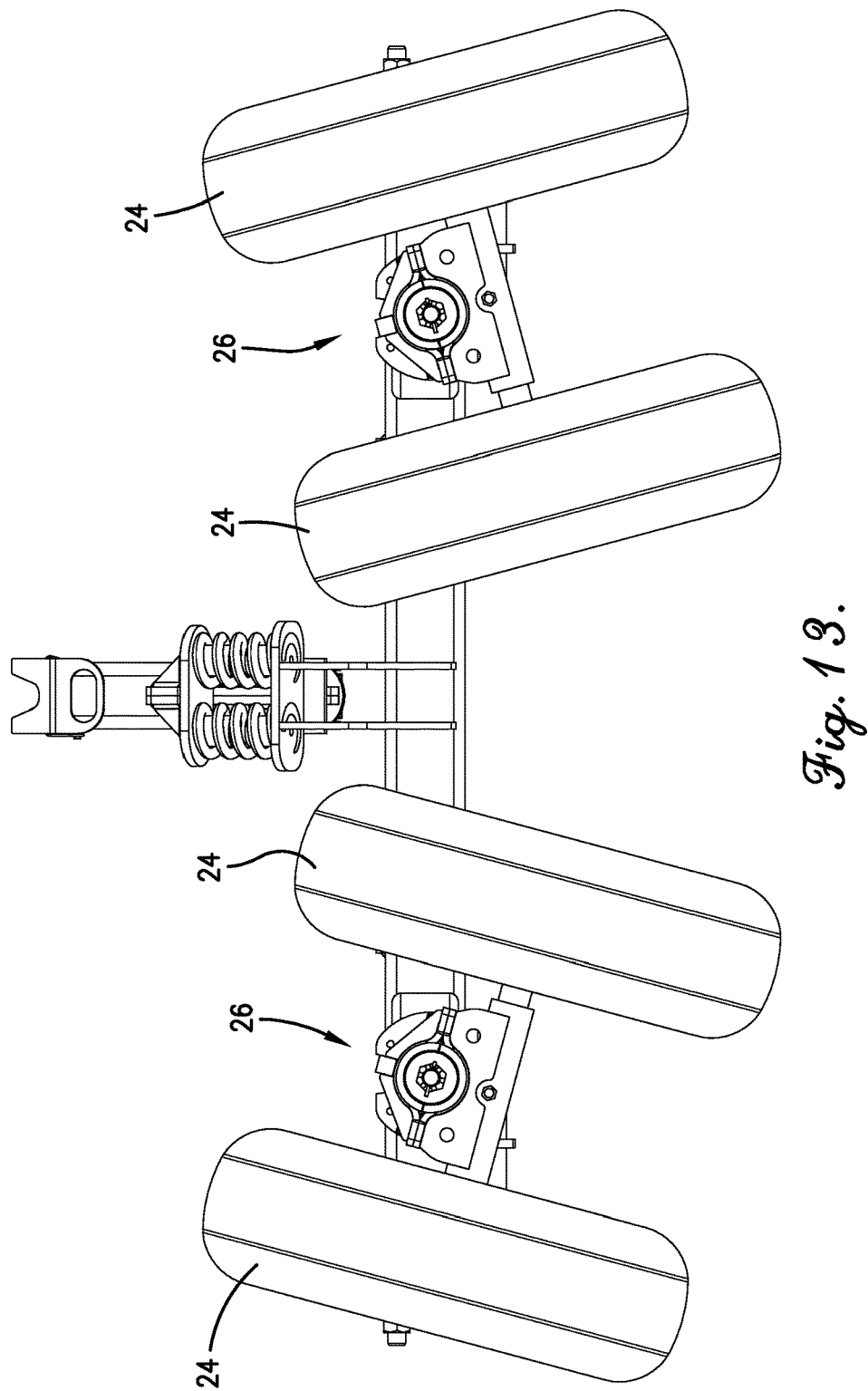
FIG. 13 is a back elevation view of two wheel support assemblies according to embodiments of the present invention, particularly illustrating an orientation of the wheel support assemblies being directed over an uneven ground surface.

As an example of the wheel support assembly 26 in operation with the rotary cutter 10, when the rotary cutter 10 is traversing over uneven ground, the ground may cause a first of the wheels 24 (on a first end of the hub spindle 40) to be lifted, such that the first of the wheels 24 follows the contour of the uneven ground. If the hub spindle 40 was not permitted to rotate, the second of the wheels 24 would similarly be caused to be lifted, regardless of the contour of the ground under the second of the wheels 24. As such, in some cases, the second of the wheels 24 may be caused to be lifted away from and out of contact with the ground, which results in reduced support and maneuverability of the rotary cutter 10. On the other hand, embodiments of the present invention, and particularly the damping mechanism 41, provide for the rotation of the hub spindle 40, as was described above. As such, a lifting (or lowering) of the first wheel of the pair of wheels 24 will cause a corresponding lowering (or lifting) of the second one of the wheels 24. In particular, the wheel support assembly 26 provides for the bracket 38, and the hub spindle 40 secured thereto, to at least minimally rotate about the pivot spindle 34, via the elasticity of the damping mechanism 41. Such rotation allows each of the wheels 24 of a pair of wheels 24 to follow the contours of the ground over which the rotary cutter 10 is traveling, as illustrated in FIG. 13. As such, embodiments of the present invention provide for each of the wheels 24 of a pair of wheels 24 to remain in contact with the ground, even while the rotary cutter 10 is traversing uneven ground or performing turning maneuvers, thereby increasing the stability and maneuverability of the rotary cutter 10.

For example, embodiments of the present invention include a method of operating the rotary cutter 10 as it is being pulled behind a tractor. The method may include an initial step of operating the tractor such that the rotary cutter 10 is pulled behind the tractor over a ground surface. The method may include an additional step of directing the wheel support assembly 26 over a generally horizontal portion of the ground surface, such that the transverse support assembly 30 is orientated generally horizontally. The method may include a further step of directing the wheel support assembly 26 over an uneven portion of the ground surface, such that the uneven ground causes a first wheel 24 of the pair of wheels 24 to raise and a second wheel 24 of the pair of wheels 24 to lower, and such that each of the first and second wheels 24 maintain contact with the ground surface. In some instances, such as when the mechanical lock system 70 restricts the transverse support assembly from rotating beyond a preset angular range of motion of 60 degrees, when the uneven ground includes a slope of more than 30 degrees, the transverse support assembly 30 will be rotated by no more than 30 degrees with respect to the longitudinal support assembly 28 and/or the housing 12 of the rotary cutter 10.

In addition to increasing stability and maneuverability of the rotary cutter 10, the configuration of the wheel support assemblies 26 of embodiments of the present invention may reduce the overall wear and tear on the components of the wheel support assemblies 26. Specifically, due to the elasticity of the damping mechanisms 41, the damping mechanism 41 is configured to absorb significant portions of the impact forces experienced by the wheel support assemblies 26 during use of the rotary cutter 10. For example, as the rotary cutter 10 travels over uneven ground, impact forces imparted to the wheels 24 by the ground may be at least partially absorbed by the damping mechanisms 41. As such, the portion of the impact forces felt by the pivot spindles 34 and the remaining components of the wheel support assemblies 26 are reduced, thereby increasing the durability of the components of the wheel support assemblies 26.

In addition to the damping mechanisms' 41 ability to enhance the durability of the wheel support assemblies 26, the lock bar 72 and the receiving notch 74 of each of the wheel support assemblies 26 may also facilitate durability of the components of the associated wheel support assembly 26. In particular, because the lock bar 72 and the receiving notch 74 restrict the angular rotation of the bracket 38 (and the hub spindle 40 and the wheels 24) to a predetermined angular range, the components of the wheel support assembly 26 will experience less impact and/or impulse forces. Specifically, because the bracket 38 (and the hub spindle 40 and the wheels 24) is restricted from rotating beyond the predetermined angular range defined by the lock bar 72 and the receiving notch 74, any changes in ground contour (even if greater than such predetermined angular range) will not cause the bracket 38 (and the hub spindle 40 and the wheels 24) to rotate more than allowed by the lock bar 72 and the receiving notch 74, thereby reducing the magnitude of impact and/or impulse forces that could potentially be applied to the components of the wheel support assembly 26.

In addition to increasing the durability of the components of the wheel support assembly 26, the lock bar 72 and the receiving notch 74 allow for the rotary cutter 10 to continue to operate should the rotary cutter 10 experience a tire or a bearing failure. In more detail, if the tire associated with the first wheel 24 of the pair of wheels 24 fails (e.g., a flat or blown tire), the tire associated with the second wheel 24 from the pair of wheels 24 can continue to support the rotary cutter 10. Specifically, the lock bar 72 and the receiving notch 74 are configured to restrict the bracket 38 (and the hub spindle 40 and the wheels 24) from rotating beyond the predetermined angular range defined by the lock bar 72 and the receiving notch 74. As such, the bracket 38 can be restricted from rotating to a point where the failed tire and its associated first wheel 24 contact or drag on the ground. Instead, the restriction of the lock bar 72 and the receiving notch 74 will cause the failed tire and its associated first wheel 24 to remain spaced above the ground with enough clearance to allow the rotary cutter 10 to continue to travel. In some embodiments, the failed tire and its associated first wheel 24 may be spaced apart from the ground enough to allow for the tire of the first wheel 24 to be changed with a new tire.

In additional embodiments, the mechanical lock system may facilitate the continued operation of the rotary cutter 10 during a tire failure. Specifically, when a fastener is inserted through the through holes 76, 78 on each of the bracket 38 and the main support component 32, the rotation of the bracket 38 (and the hub spindle 40 and the wheels 24) is restricted. As such, the bracket 38, the hub spindle 40, and the wheels/tires of the pair of wheels 24 will remain generally in a horizontal orientation. As such, a tire that has failed will remain spaced apart from the ground to allow clearance for the rotary cutter 10 to continue operation or for the failed tire to be changed.

In addition to allowing the rotary cutter 10 to remain operational during a tire failure, the lock bar 72 and the receiving notch 74, as well as the fastener and through holes 76, 78 combinations of the mechanical lock system, each facilitate loading and unloading of the rotary cutter 10. Specifically, when the bracket 38, the hub spindle 40, and the wheels of the pair of wheels 24 are prevented and/or restricted from rotating, one or more of the wheels can be directed on a ramp for loading/unloading of the rotary cutter 10 onto or off of a vehicle, a trailer, a tractor trailer or the like. Previously-used rotary cutters, such as rotary cutters with walking-tandem wheel configurations, could not accomplish such ramp loading and unloading because when one of the wheels of a pair of wheels would be directed on a ramp, the other wheel of the pair of wheels would be caused to rotate to such a severe angle that the wheel support assemblies would be overstressed and maneuverability of the rotary cutter was not feasible. However, the lock bar 72 and the receiving notch 74, as well as the fastener and through holes 76, 78 combinations of the mechanical lock system, facilitate the ability of the transverse support assembly 30 to remain generally horizontal (or at least nearly horizontal), such that each of the wheels 24 can remain at substantially the same height and in contact with the ramp to (1) facilitate maneuverability, and (2) prevent overstress by maintaining an even distribution of weight.

Finally, in certain embodiments, such as illustrated in FIGS. 1 and 4-6, the rotary cutter 10 may also include an actuator 82 for actuating the wheel support assemblies 26 and the pairs of wheels 24. As shown in the drawings (e.g., FIGS. 1, 4, 5, and 7), the actuator 82 may be secured to the housing 12 and to the base assembly 62 that extends along the back side 16 of the housing 12. Each of the wheel support assemblies 26 may be connected to the base assembly 62 (e.g., via the main support component 32), such that actuation of the base assembly 62 causes a corresponding movement of the wheel support assemblies 26. The actuator 82 can be powered mechanically, electrically, hydraulically, pneumatically, or the like. As such, the actuator 82 is configured to actuate the wheel support assemblies 26, including the pairs of wheels 24 associated therewith, to be either in an operational configuration or a travel configuration. In the operational configuration the actuator 82 causes the wheel support assemblies 26 to be positioned such that the pivot spindles 34 are orientated generally horizontally. In such a configuration, wheel support assemblies 26 cause the housing 12 of the rotary cutter 10 to be positioned above the ground at a preferred height for the cutter blades 22 to cut vegetation that extends from the ground. Alternatively, in the travel configuration, the actuator 82 causes the wheel support assemblies 26 to be positioned such that the pivot spindles 34 are orientated downward (i.e., with the distalmost end pointed downward) between about 0 and 90 degrees, 10 and 75 degrees, between about 15 and 60 degrees, or between about 30 and 45 degrees from horizontal. Regardless, the actuator 82 forces the wheel support assemblies 26 and the corresponding pair of wheels 24 to be forced towards the ground, thereby resulting in the housing 12 being raised up from the ground. In such a travel configuration, the housing 12 and the cutter blades 22 are spaced apart from the ground such that the rotary cutter 10 can travel without interfering with vegetation or other obstacles on the ground.

It should also be understood that in the travel configuration (i.e., with the pivot spindle 34 orientated downward between about 30 and 45 degrees from horizontal), the bracket 38 and the pairs of wheels 24 will be partially restricted from rotating about the pivot spindle 34. In particular, much of the force applied from the ground will be directed as a compression force from the pair of wheels 24 and bracket 38 directly into the support component 32 and to the back side 16 of the rotary cutter 10. As such, any impact forces resulting from interaction with the ground will have a reduced effect on the rotation of the bracket 38 about the pivot spindle 34, thereby providing enhanced stability in the travel configuration at various travel speeds.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An agricultural implement for use with a tractor, said agricultural implement comprising:
    a main body;
    a hitch extending forward from said main body and operable to couple said implement to the tractor;
    a plurality of wheel support assemblies extending rearward from said main body; and
    a pair of wheels coupled to each of said wheel support assemblies,
    wherein each of said wheel support assemblies includes—
    a longitudinal support assembly extending generally rearward from said main body; and
    a transverse support assembly coupled to said longitudinal support assembly, wherein each of said wheels of said pair of wheels are disposed on generally opposite sides of said transverse support assembly, wherein said transverse support assembly is rotatable relative to said main body, such that a raising of one wheel of said pair of wheels causes a corresponding lowering of another wheel of said pair of wheels,
    wherein each of said wheel support assemblies further comprises a stop system configured to restrict said transverse support assembly and said pair of wheels from rotating beyond a predetermined angular range,
    wherein said stop system comprises a lock bar extending from said transverse support assembly and into a receiving notch presented by said longitudinal support assembly.

2. The agricultural implement of claim 1, wherein said longitudinal support assembly comprises a main support component with a first end and a second end and a pivot spindle at least partially received in the second end of said main support component.

3. The agricultural implement of claim 2, wherein said transverse support assembly is rotatable about a longitudinal axis that extends through said pivot spindle.

4. The agricultural implement of claim 3, wherein said transverse support assembly comprises a bracket for rotatably coupling said transverse support assembly to said pivot spindle, wherein said transverse support assembly further comprises a hub spindle for supporting said pair of wheels.

5. The agricultural implement of claim 4, further comprising a rotational damping mechanism secured between said pivot spindle and said bracket, wherein said rotational damping mechanism is configured to restrict rotation of said transverse assembly and said pair of wheels relative to said main body.

6. The agricultural implement of claim 5, wherein said rotational damping mechanism comprises an elastomeric member.

7. The agricultural implement of claim 6, wherein said rotational damping mechanism is formed as a hollow cylinder, and includes one or more flared lips extending from an outer surface of said hollow cylinder.

8. The agricultural implement of claim 6, wherein said rotational damping mechanism has a shore durometer of between 60 and 90 A.

9. The agricultural implement of claim 6, wherein said rotational damping mechanism is configured to restrict the rotation of said transverse support assembly and said pair of wheels relative to said main body by absorbing and dissipating at least a portion of the rotation of said transverse support assembly and said pair of wheels.

10. The agricultural implement of claim 1, wherein said angular range spans no more than 50 degrees.

11. The agricultural implement of claim 1, wherein said agricultural implement is selected from the following: a rotary cutter, a seeder, and a tiller.

12. A rotary cutter for cutting vegetation, said rotary cutter comprising:
    a cutter housing;
    one or more cutter blades extending down from a bottom side of said cutter housing;
    a hitch extending forward from said cutter housing, wherein said hitch is operable to connect said rotary cutter with a tractor;
    a plurality of wheel support assemblies extending along a back side of said cutter housing; and
    a pair of wheels coupled to each of said wheel support assemblies, wherein said wheels of each of said pairs of wheels are generally aligned in parallel relationship and spaced laterally apart across the back side of said cutter housing,
wherein each of said wheel support assemblies includes—
a longitudinal support assembly extending generally rearward from said cutter housing; and
a transverse support assembly coupled to said longitudinal support assembly, wherein said pair of the wheels are coupled to said transverse support assembly, and wherein said transverse support assembly is rotatable relative to said housing such that a raising of one wheel of said pair of wheels causes a corresponding lowering of another wheel of said pair of wheels,
wherein each of said wheel support assemblies further comprises a stop system configured to restrict said transverse support assembly and said pair of wheels from rotating beyond a predetermined angular range,
wherein said stop system comprises a lock bar extending into a receiving opening.

13. The rotary cutter of claim 12, wherein said rotary cutter includes at least two wheel support assemblies extending along the back side of said cutter housing.

14. The rotary cutter of claim 12, wherein each of said wheel support assemblies includes a lock system configured to selectively lock said pair of wheels at substantially the same height.

15. The rotary cutter of claim 14, wherein said lock system comprises a first through hole located on said transverse support assembly, a second through hole located on said longitudinal support assembly, and a fastener, and wherein said fastener is configured to extend through each of said first and second through holes when such first and second through holes are aligned.

16. The rotary cutter of claim 12, wherein said lock bar extends from said transverse support assembly and said receiving opening is presented by said longitudinal support assembly.

17. The rotary cutter of claim 12, wherein said lock bar has a generally rectangular cross-section, wherein said receiving opening is a notch having an open side.

18. The rotary cutter of claim 12, wherein, when said rotary cutter is passed over severely uneven ground having a slope of more than 30 degrees, said stop system is configured to prevent said transverse support assembly from rotating by more than 30 degrees with respect to the longitudinal support assembly.

19. A method of operating an agricultural implement configured to be pulled behind a tractor, wherein the implement comprises at least one pair of wheels supporting the implement from the ground, wherein the pair of wheels are secured to the implement in a transversely spaced parallel relationship via a wheel support assembly, and wherein the wheel support assembly comprises a longitudinal support assembly extending from a back side of the agricultural implement, and a transverse support assembly rotatably coupled with the longitudinal support assembly, said method comprising the following steps:
(a) operating the tractor such that the agricultural implement is pulled behind the tractor over a ground surface;
(b) directing the wheel support assembly over a generally horizontal portion of the ground surface, wherein during said directing of step (b), the transverse support assembly is orientated generally horizontally;
(c) directing the wheel support assembly over an uneven portion of the ground surface, wherein during said directing of step (c), the uneven ground surface causes a first wheel of the pair of wheels to raise and a second wheel of the pair of wheels to lower, and wherein each of the first and second wheels maintain contact with the ground surface; and
(d) directing the wheel support assembly over a severely uneven portion of the ground surface, wherein the severely uneven ground surface is sloped by more than 30 degrees, and wherein during said directing of the wheel support assembly over the severely uneven portion of the ground surface, said transverse support assembly is rotated by no more than 30 degrees with respect to the longitudinal support assembly.

20. A method of operating an agricultural implement configured to be pulled behind a tractor, wherein the implement comprises at least one pair of wheels supporting the implement from the ground, wherein the pair of wheels are secured to the implement in a transversely spaced parallel relationship via a wheel support assembly, and wherein the wheel support assembly comprises a longitudinal support assembly extending from a back side of the agricultural implement, and a transverse support assembly rotatably coupled with the longitudinal support assembly, said method comprising the following steps:
(a) operating the tractor such that the agricultural implement is pulled behind the tractor over a ground surface;
(b) directing the wheel support assembly over a generally horizontal portion of the ground surface, wherein during said directing of step (b), the transverse support assembly is orientated generally horizontally;
(c) directing the wheel support assembly over an uneven portion of the ground surface, wherein during said directing of step (c), the uneven ground surface causes a first wheel of the pair of wheels to raise and a second wheel of the pair of wheels to lower; and
wherein each of the first and second wheels maintain contact with the ground surface; and
(d) locking the transverse support assembly to the longitudinal support assembly, such that the longitudinal support assembly is prevented from rotating with respect to the transverse support assembly.

* * * * *